United States Patent
Yehaskel

(10) Patent No.: US 10,509,831 B2
(45) Date of Patent: Dec. 17, 2019

(54) SYSTEMS AND METHODS FOR TIME AND SPACE ALGORITHM USAGE

(75) Inventor: David M. Yehaskel, Austin, TX (US)

(73) Assignee: LEAF GROUP LTD., Santa Monica, CA (US)

( * ) Notice: Subject to any disclaimer, the term of this patent is extended or adjusted under 35 U.S.C. 154(b) by 327 days.

(21) Appl. No.: 13/560,906

(22) Filed: Jul. 27, 2012

(65) Prior Publication Data

US 2013/0031465 A1    Jan. 31, 2013

Related U.S. Application Data

(60) Provisional application No. 61/513,374, filed on Jul. 29, 2011.

(51) Int. Cl.
*G06F 16/9535* (2019.01)
*G06F 16/2457* (2019.01)

(52) U.S. Cl.
CPC .... *G06F 16/9535* (2019.01); *G06F 16/24575* (2019.01)

(58) Field of Classification Search
None
See application file for complete search history.

(56) References Cited

U.S. PATENT DOCUMENTS

| | | | |
|---|---|---|---|
| 6,757,691 B1 | 6/2004 | Welsh et al. | |
| 7,080,138 B1 | 7/2006 | Baker et al. | |
| 8,856,331 B2 | 10/2014 | Coyer et al. | |
| 9,721,035 B2 | 8/2017 | Fink et al. | |
| 2002/0092019 A1 | 7/2002 | Marcus | |
| 2003/0182308 A1 | 9/2003 | Ernst et al. | |
| 2004/0093327 A1 | 5/2004 | Anderson et al. | |
| 2004/0205593 A1 | 10/2004 | Kraemer | |
| 2005/0065847 A1* | 3/2005 | Feeley et al. | 705/14 |
| 2005/0076061 A1 | 4/2005 | Cox | |
| 2005/0177358 A1 | 8/2005 | Melomed et al. | |
| 2007/0100698 A1* | 5/2007 | Neiman et al. | 705/14 |
| 2008/0071929 A1* | 3/2008 | Motte | G06F 17/3089 709/246 |
| 2008/0168032 A1 | 7/2008 | Criou et al. | |
| 2009/0198580 A1* | 8/2009 | Broberg et al. | 705/14 |
| 2010/0010865 A1* | 1/2010 | Dyer | G06F 17/30648 705/14.52 |
| 2010/0041419 A1 | 2/2010 | Svendsen et al. | |
| 2010/0049796 A1 | 2/2010 | Kawamura et al. | |
| 2010/0138443 A1 | 6/2010 | Ramakrishnan et al. | |
| 2010/0146144 A1* | 6/2010 | Audenaert et al. | 709/235 |
| 2010/0153518 A1* | 6/2010 | Kitts | 709/217 |

(Continued)

FOREIGN PATENT DOCUMENTS

WO    2010111964    10/2010

*Primary Examiner* — Alexandru Cirnu
(74) *Attorney, Agent, or Firm* — Greenberg Traurig, LLP

(57) ABSTRACT

A system and method for determining suggested content and suggested content headlines for a web page. The system and method receive a request for suggested content for a web page, determine that suggested content is appropriate for the web page based on tags for the web page and tags for a suggested content headline associated with the suggested content, apply a rule to the tags of the suggested content headline, the rule based on one or more of time and location metadata, and transmit the suggested content headline for display with the web page if the rule has been satisfied.

5 Claims, 13 Drawing Sheets

(56) References Cited

U.S. PATENT DOCUMENTS

| | | |
|---|---|---|
| 2010/0278425 A1 | 11/2010 | Takemoto et al. |
| 2011/0055718 A1 | 3/2011 | Tanaka et al. |
| 2011/0161847 A1 | 6/2011 | Chaikin et al. |
| 2011/0264736 A1 | 10/2011 | Zuckerberg et al. |
| 2011/0302145 A1 | 12/2011 | Brown et al. |
| 2012/0030014 A1 | 2/2012 | Brunsman et al. |
| 2012/0030015 A1* | 2/2012 | Brunsman et al. ........ 705/14.49 |
| 2012/0167010 A1 | 6/2012 | Campbell et al. |
| 2013/0031450 A1 | 1/2013 | Reese |
| 2013/0036191 A1 | 2/2013 | Fink et al. |
| 2018/0011943 A1 | 1/2018 | Fink et al. |

\* cited by examiner

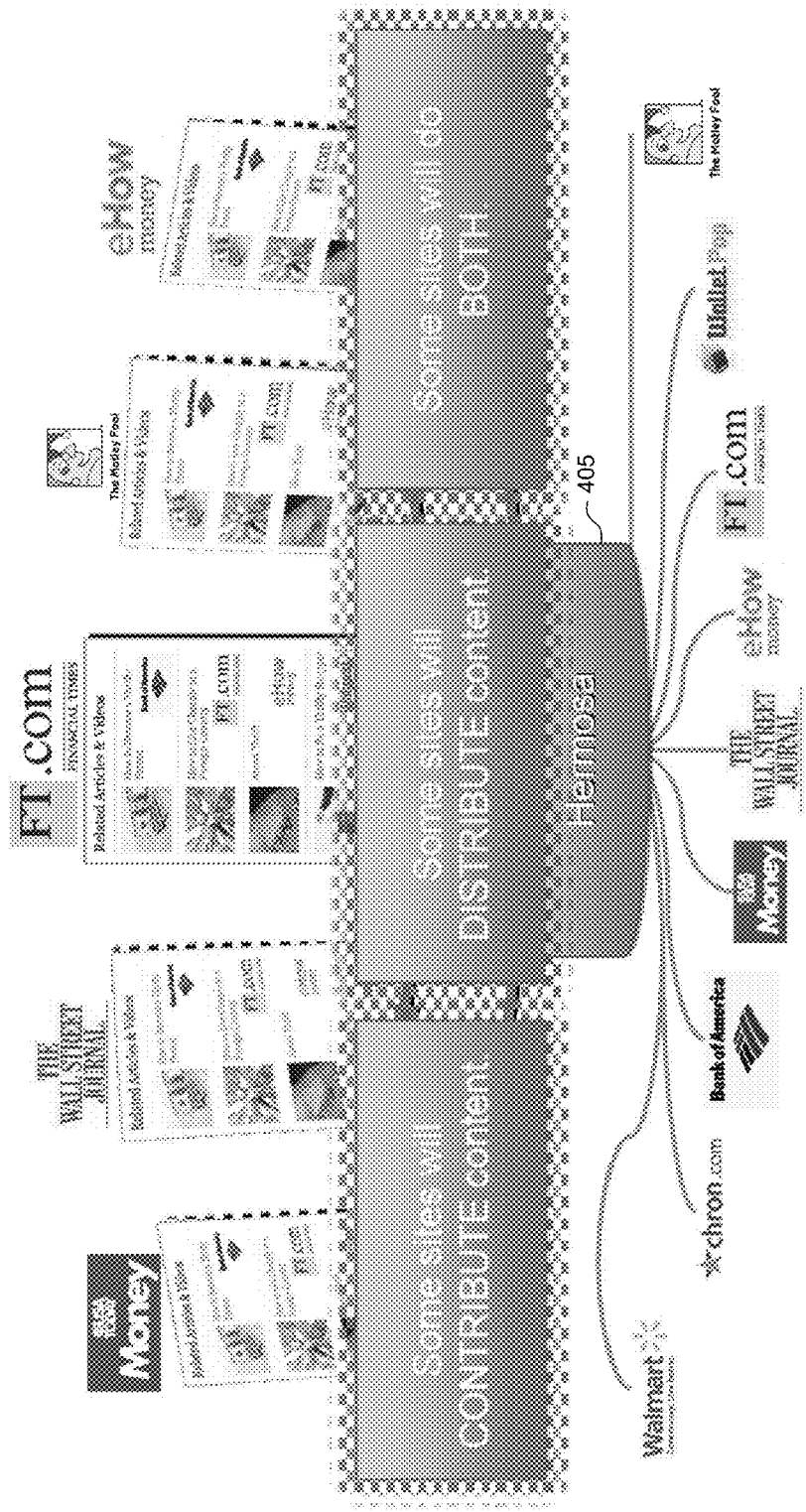

FIG. 7

Hermosa Alpha Product: Widget examples

Hermosa Alpha Product: Console

- Easy dashboard to view key metrics
- Reporting capabilities to drill down; includes export capability

SYSTEMS AND METHODS FOR TIME AND SPACE ALGORITHM USAGE

CROSS-REFERENCE TO RELATED APPLICATIONS

The present application claims the benefit of U.S. Provisional Patent Application No. 61/513,374, filed Jul. 29, 2011, entitled "SYSTEMS AND METHODS FOR TIME AND SPACE ALGORITHM USAGE," by Yehaskel, and is also related to U.S. patent application Ser. No. 12/828,200, filed Jun. 30, 2010, entitled "RULE-BASED SYSTEM AND METHOD TO ASSOCIATE ATTRIBUTES TO TEXT STRINGS," by Yehaskel et al., is also related to U.S. patent application Ser. No. 12/877,935, filed Sep. 8, 2010, entitled "SYSTEMS AND METHODS FOR KEYWORD ANALYZER," by Yehaskel et al., and is also related to U.S. patent application Ser. No. 13/285,874, filed Oct. 31, 2010, entitled "SYSTEMS AND METHODS FOR RECOMMENDED CONTENT PLATFORM," by Fink et al., the entire contents of which applications are incorporated by reference as if fully set forth herein.

FIELD OF THE TECHNOLOGY

At least some embodiments disclosed herein relate to computer or data processing systems in general, and more particularly, but not limited to, presentation (to a user of a computing device) of content, or a title or link to content, that has been selected based on time and location-based rules.

BACKGROUND

Websites employ several means to bring visitors to the websites. They may advertise, get listed in search engines and directories, and otherwise promote their website.

Once a website has attracted a visitor to the website, the website is often operated to try to get the visitor to stay on the site and consume more Internet content. This may involve offering the visitor a choice of additional content to consume.

To limit the amount of "screen real estate" that this choice of additional content occupies, the visitor is often just shown the titles of the additional pieces of content in the hope that one of these titles will induce the visitor to click on the link to read the additional article.

One type of website is a news site, such as sponsored by CNN or CBS Marketwatch. News sites typically have a "home page" that acts as a destination point for a user who navigates on the Internet, for example, to a site such as WWW.EXAMPLE-NEWS-SITE.COM. The Home Page presents the user with the day's top news stories by utilizing a number of representations such as typography, thumbnail images, short descriptions, or all of those things, that then link to individual pages (e.g., containing text, images and/or video content). These individual pages are commonly referred to as Article Pages.

SUMMARY

Most targeted links (e.g., advertisements or related content) on a web page focus on general demographics of the web site (e.g., this Mommy blog would be a great place to advertise our laundry detergent"), cookied user behavior (on current site and/or across multiple sites), and behavior of other users like yourself (e.g., people who bought peanut butter A also bought jelly B).

In one aspect, a system and method receive, by a computing device over a network, a request for suggested content for a web page, determine, by the computing device, that suggested content is appropriate for the web page based on tags for the web page and tags for a suggested content headline associated with the suggested content, apply, by the computing device, a rule to the tags of the suggested content headline, the rule based on one or more of time and location metadata, and transmit, by the computing device over the network, the suggested content headline for display with the web page if the rule has been satisfied.

In one embodiment, the time and/or location metadata include external conditions at a specific location, such as weather, floods, droughts, sun, rain, temperature, and season. In one embodiment, the time and/or location metadata include a duration of time or days to display the suggested content headline. In one embodiment, the time and/or location metadata include regional events or conditions. In one embodiment, the time and/or location metadata include a particular subset of locations, such as a coastal location, an inland location, an urban location, a rural location, east coast, west coast, north, and/or south.

In one embodiment, the suggested content of the web page includes additional content that a user viewing the web page will find interesting. In one embodiment, the web page is tagged with tags describing characteristics of the web page. In one embodiment, the tags of the suggested content headline are overlayed with the one or more time and location metadata.

In another aspect, a method and system develop headlines for suggested content associated with a web page. The headlines are tagged with one or more of time and location metadata, and statistics relating to performance of the headlines in generating user interest are determined. One or more rules are then built. The rules are based on the statistics and affect whether the headlines are provided with the web page when the web page is displayed.

In one embodiment, the determining of the statistics include determining statistics relating to time and/or location.

BRIEF DESCRIPTION OF THE DRAWINGS

Various embodiments of the disclosure are illustrated by way of example and not limitation in the figures of the accompanying drawings in which like references indicate similar elements.

FIG. 4 shows the collection and selection of content, and distribution of content, to users of a communication network in accordance with an embodiment of the disclosure;

FIG. 7 shows examples of displays presented to users of widgets used in conjunction with a content selection system in order to present content options or titles for users of an end user device in accordance with an embodiment of the disclosure;

DETAILED DESCRIPTION

Figure 1A:
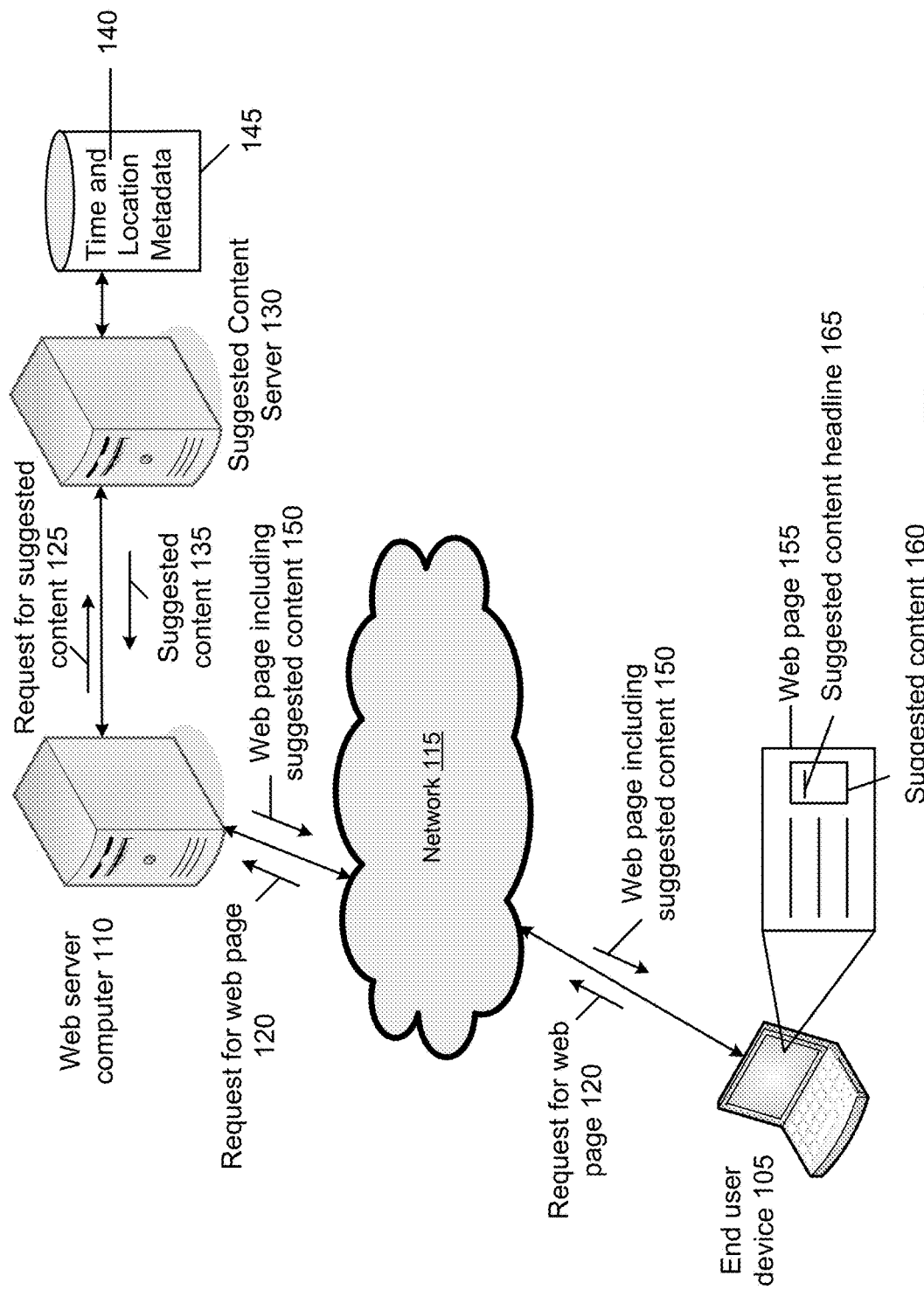
FIG. 1A is a block diagram of a web server in communication with a suggested content server and an end user device in accordance with an embodiment of the disclosure.

The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

For the purposes of this disclosure, "content" or "online content" should be understood to refer to various types of digital objects accessible over the Internet embodying the expression of one or more concepts that may be of interest to users. In one embodiment, content may take the form of text articles, such as news articles or topical articles relating to one or more topics. In one embodiment, content may take the form of multimedia objects, such as images, audio presentations, and audiovisual presentations relating to one or more topics.

For the purposes of this disclosure, "title" should be understood to represent a single sentence that could serve as a title for online content. Typically, a title conveys a single concept in a concise way that allows users to readily identify the nature of online content to which such titles are attached.

For the purposes of this disclosure, "algorithm" should be understood to generally refer to a method for inputting and processing data to produce a desired output. The method can include, without limitation a specification of data sources and data types input to the method, selection of subsets of input data, translation and transformation of input data, calculations using input data and possibly external reference data, aggregation of input data, output of results in one or more formats and/or the ordering of output data.

For the purposes of this disclosure, "link" should be understood to generally refer to data referring to content accessible, over a network, on one or more servers or other computing devices that includes, inter alia, sufficient information to access the content. Links typically include a URL or other type of URI that provides a name and a logical network path to a digital object embodying the content. More generally, however, "link" should also be understood to potentially include data that describes the content as well, which could include, without limitation, a title, an abstract or keywords that describe the content. In the present disclosure, where reference is made to a "link," it should be understood that the link includes a URI of some form that allows a user to access the content to which it refers, but could, in various embodiments, also comprise data that describes the content to which the URI refers. Where links are "displayed," it should be understood that the URI for the content and potentially any (or none) of data that describes the content to which the URI refers is displayed. It should also be understood that where a link is displayed, unless otherwise specified, the link will be user selectable to access the content to which the link refers.

For the purposes of this disclosure, "recommended content" should be understood to refer to content where, in one embodiment, it has been determined that a particular user, group of users or users in general have a potential interest in the content, and thus, the content can be "recommended" to such users for consumption. Such determination may be based on any methodology that tends to distinguish the recommended content from all content in general. As described below, one method of recommending content to users is through the application of content recommendation algorithms to available content. In other embodiments, recommendations may also be based, in whole or in part, on factors unrelated to the content or users. For example, recommendations may be made or weighted towards content items that have a higher effective pay-per-click (PPC), or are part of a class of content to which traffic is directed for a variety of reasons such as, for example, campaign fulfillment.

System Overview

Systems and methods for presentation of content, or a title or link to content (for presentation to a user) are described herein. In one embodiment, the system disclosed herein optimizes the links displayed on web pages based on content recommendation algorithms which determine which links are displayed in a given page view.

FIG. 1A is a schematic diagram illustrating an example embodiment of a network and devices implementing embodiments of the present disclosure. Other embodiments that may vary, for example, in terms of arrangement or in terms of type of components, are also intended to be included within claimed subject matter. FIG. 1A includes, for example, an end user device 105 in communication with a web server computer (also referred to as web server) 110 over a network 115. The network 115 can be a local area network (LAN)/wide area network (WAN), such as the Internet.

An end user device 105 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Web server 110 may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a server include desktop computers, multiprocessor systems, microprocessor-type or programmable consumer electronics, etc.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

End user device 105 requests a web page from the web server 110 via request 120. In one embodiment, the requested web page includes an embedded reference to obtain suggested content. The web server 110 evaluates the embedded reference and transmits a request 125 for suggested content to a suggested content server 130. In one embodiment and as described in more detail below, the suggested content server 130 utilizes one or more time- and/or location-algorithms to determine suggested content for the web page. In one embodiment, these time- and/or location-algorithms are based on time and location metadata 140 stored in a database 145. In one embodiment, the suggested content server 130 tags a suggested content headline associated with suggested content of a web page with tags describing characteristics of the suggested content. In one embodiment, the suggested content server 130 overlays the tags with time and/or location metadata 140. In one embodiment, the suggested content server 130 determines a rule that affects the displaying of the suggested content headline when combined with the time and/or location metadata 140.

The suggested content server 130 transmits the suggested content 135 to the web server 110 for inclusion in the web page. The web server 110 then transmits the web page 150 with the suggested content to the end user device 105 for display. The end user device 105 displays the web page 155 with suggested content 160. In one embodiment, the suggested content 160 includes suggested content headline 165 that has been adjusted via the time and/or location metadata 140. Although described as a separate server, the functions and operations of the suggested content server 130 may be included in the web server 110.

In one embodiment, time and location-specific, tag-based rules are utilized in conjunction with algorithmic or editorial content programming in order to increase or maximize user interest and/or click-through rates by exhibiting (or inhibiting) the display of specific pieces of content based on characteristics of the content.

Time- and location-based factors will likely affect the likelihood of clicking on links, regardless of previous behavior and other similar methods. It's another layer that can be added onto existing layers of targeting tactics. For example, suppose you live in a location that is experiencing a cool, wet summer. Based on this location metadata, you are typically less likely to click on links related to swimming pools.

Another location-based example is that, regardless of how good a content provider's Christmas content is doing, if the IP address of the user is originating from a location that is home to mostly orthodox Jews, the content provider can safely assume that they will get very few clicks (if any) on any Christmas-related content.

Time filters also work similarly, but use more historical data to create filters. For example, if articles about pancakes get 3 times as many clicks on weekends compared with the number of clicks received during the week, it would show up less often in Related Links on weekdays. With respect to potato recipes, hash browns usually do well in the morning and baked potatoes typically do well in the afternoon and evening (in their respective time zones). In one embodiment, these time- and space-features are provided to an algorithm executed by the suggested content server 130.

Historical data can be obtained from a variety of sources, including, for example, logs of user interaction data collected by the suggested content server 130 or third-party websites. For example, user interaction data can include, without limitation, impressions, click-through-rate (CTR), subsequent-views-per-session (PV), ad clicks, ad clicks per session, revenue, revenue per session, and weighted views.

For illustrative purposes, a news site will be used as an example in the following discussion (using conventional language to describe its parts and processes). As mentioned earlier, a news site typically has a home page that acts as a destination point for a user who navigates on the Internet (or another communication network).

Content Modules

Web page/site 155 may feature a plurality of Content Modules (suggested content 160), typically the size of a large ad and placed on individual Article Pages (to the sides or bottom of the Article text) that feature suggestions for additional content the user may find to his or her liking These modules may contain a short list of textual links (or other representations); the text contained in those links will be referred to as Headlines in this description below. Depending on the web site's goals and objectives, these modules may be referred to as Related Content, Suggested Content, or similar names; in this description below, the phrase "Suggested Content Module" (e.g., suggested content 160) will be used.

Content Module Methods

Various methods and tactics described as follows may be used for choosing and publishing specific Headlines 165 in the Suggested Content Modules 160. These methods and tactics may be used independently or in various combinations as desired for a given implementation.

Content Module Methods—Similar Articles

Some modules may feature similar Article Pages, where similarity is based on the original page's topic, sub-topic, theme, classification, words, or other measures of similarity.

Content Module Methods—User Profile-Based Recommendations

Other methods used for Suggested Content Modules revolve less around the Article Page that the user visited, and more on the user himself; the user's previous actions and preferences (e.g., on the Web Site he is currently visiting, and possibly from other sites he previously visited, as well) are implicitly or explicitly gathered and analyzed as a more holistic profile of the user's demographics and likely interests.

Content Module Methods—Suggested Content

In other embodiments, still other methods may be used to program Suggested Content modules. Randomly chosen or "best guess" Article Pages are chosen to be displayed, and by rotating the selection randomly, winners and losers may be determined based on actual performance/results.

Time- & Location-Based Metadata

In one embodiment, regardless of the methods and tactics used to present Suggested Content 160, there are often relevant facts related to the user's location in both time and space that will affect his potential interest in the Suggested Content 160. Furthermore, because of the large volume of Internet users, it is easier to aggregate other users visiting a popular web site, with millions of combinations and permutations of:

a particular duration of time (9-10 AM, day/night, morning/afternoon/evening/night, etc.)

a particular subset of locations (coastal/inland, urban/rural, east/west coast, north/south)

experiencing particular external conditions such as weather (floods/drought, sun/rain, temperature, season, etc.)

other regional events or conditions (economy, current events, social and political norms, etc.)

At a basic level, for example, it is less likely (e.g., as a whole, on average, randomly chosen) that users accessing the Internet from the Midwest region of the United States in January would be interested in a Headline about surfing off the coast of California, than a Headline about de-icing an auto lock.

Similarly, a person located in a climatological area that is either flooded or drought-stricken likely has little ability or interest in viewing/reading mainstream gardening content (though he or she might very well be interested in dealing with such challenges, as discussed further below). Additionally, other types of Headline links may perform better on certain days of the week, and/or certain times within those days. Some or all of these variables may significantly affect the performance (e.g., as measured by Click Through Rate) of these links.

In one embodiment, there are two main uses for this metadata:

Tagging performance metrics—useful for grouping separate and overlapping characteristics like August and Mondays, or Sunday and weekend, or urban and coastal; these tags will form smaller chunks of metrics to analyze.

Tagging Article Headlines—useful for grouping Headlines by their dependence on Time and Location. For example, gardening articles that are not about indoor gardening can be tagged as outdoors. Articles about Christmas can be tagged with holiday, winter, and christmas.

The above examples may predict the specific Time and/or Location dimensions that are measurably affecting the performance of individual Suggested Content Headline links.

It may be determined, for example, that Headlines tagged with "winter" perform well regardless of whether the season is actually fall or winter, but only in locations with a temperature below a specified value. In locations above that value, it may be found to perform poorly. Thus, the negative and positive performance correlations would indicate where specifically to display that Headline, as well as where not to display that Headline.

Other Variables

In one embodiment, there are numerous other variables that may be considered, such as the article Topic, Target Audience, and other characteristics. One variable that offers a significant degree of control is the set of the actual words that are used in the Headline.

Headline Hooks

In one embodiment, consider a simple Headline example such as "How to Tell if Your Husband Is Cheating On You" and its editorial possibilities; a traditional copy-editor's job is to rewrite the Headline so that it informs, but also for it to entice a user to read the rest of the story. This can be done by activating basic psychological hooks, such as, for example, Curiosity, Fear, Jealousy, Sex. A few exemplary variations of that Headline include:

Would You Know If Your Husband Was Cheating On You?
5 Warning Signs That He's Cheating on You
Is Your Husband Cheating With Another Woman?
Find Out If He's Cheating On You Now!

Headline Format

Additionally, the format of a Headline likely affects the delivery and reception of those psychological hooks, adding yet another dimension to which performance can be measured. Some format variations include:

Question
Command
List
Top 5, 10, etc.
How To

Headline Tags: Hook+Format

Headline Tags are tags that describe the tone and hook of the copy written Headlines. They are derived from existing and newly-expanded rules. Considering there are relatively few basic ways to write a headline (typically in the hundreds, as a typical maximum number), these can be encoded manually or in small batches with a high degree of accuracy. In other embodiments, these can be encoded automatically using a data processing system.

Here are some examples of Headline Hook+Format tags for an Article originally titled: "Choosing the Best Sunscreen for Kids":

| Headline | Tags: Headline Edits |
| --- | --- |
| 5 Terrible Things Sunscreen Does to Your Kids | list, 5, curiosity, negative |
| Are All Sunscreens Safe for Kids? | question, curiosity, informative, yes-no |
| You May Not Want to Use That Sunscreen on Your Kids | fear, threat, negative, curiosity, regret, negative |
| The Best Sunscreen for Kids | superlative, best, simple |

Method Embodiment

A method in one embodiment may be performed (e.g., using a data processing system) as follows:

Operation 1. Tag Base Article

Each Article Page that will potentially be used for programming Suggested Content 160, can first be tagged with metadata that describe its characteristics. In one embodiment, an approach may be used as described in U.S. patent application Ser. No. 12/828,200, filed Jun. 30, 2010, entitled "RULE-BASED SYSTEM AND METHOD TO ASSOCIATE ATTRIBUTES TO TEXT STRINGS," which was incorporated by reference above.

Examples of Tag Output: choosing, kids, safety, skin, outdoors

Operation 2. Tag Headline

Add the tags discussed in the section titled "Headline Tags: Hook+Format" above.

Operation 3. Isolate and Test Headline Tag Combinations

Find out which combinations work best and worst. This is enough to start optimizing for highest performance. This operation can be accomplished in many ways—manually, or with the help of machine learning algorithms. In one embodiment, an approach may be used as described in U.S. patent application Ser. No. 12/877,935, filed Sep. 8, 2010, entitled "SYSTEMS AND METHODS FOR KEYWORD ANALYZER," which was incorporated by reference above.

For example, it is determined which combinations of the following metadata will work best/worst:

Topic+Hook
Topic+Format
Format+Hook
Topic+Format+Hook

Operation 4. Overlay Likely Headline Tag Combinations with Time and Location Metadata One or more of the following, for example, may be determined: Did Headlines that were tagged with outdoors, do better in geographical locations where the weather was more temperate? Did Headlines tagged with the combination outdoors+gardening spike in certain areas of the country? Did the weather have any effect? What part of the country has users that click the most/least on Headlines about Sports? Or even further on subset topics such as tennis?

Operation 5. Encode Findings Into Rules

Create rules that promote or demote certain kinds of Articles when combined with Time and Location metadata. For example, it may be determined that the tags outdoors+safety may perform best:

on Fridays and Saturdays
from locations within 50 miles from the coast
in areas where the high temperature is equal to or greater than 100.

For example, a rule may be written that dictates the days of the week, the fixed locations, and weather-dependent locations where this Headline should appear in Suggested Content Modules. Additionally, purely negative rules may be written that serve only to prevent certain types of Headlines from appearing in various Times and Locations.

Figure 1B:
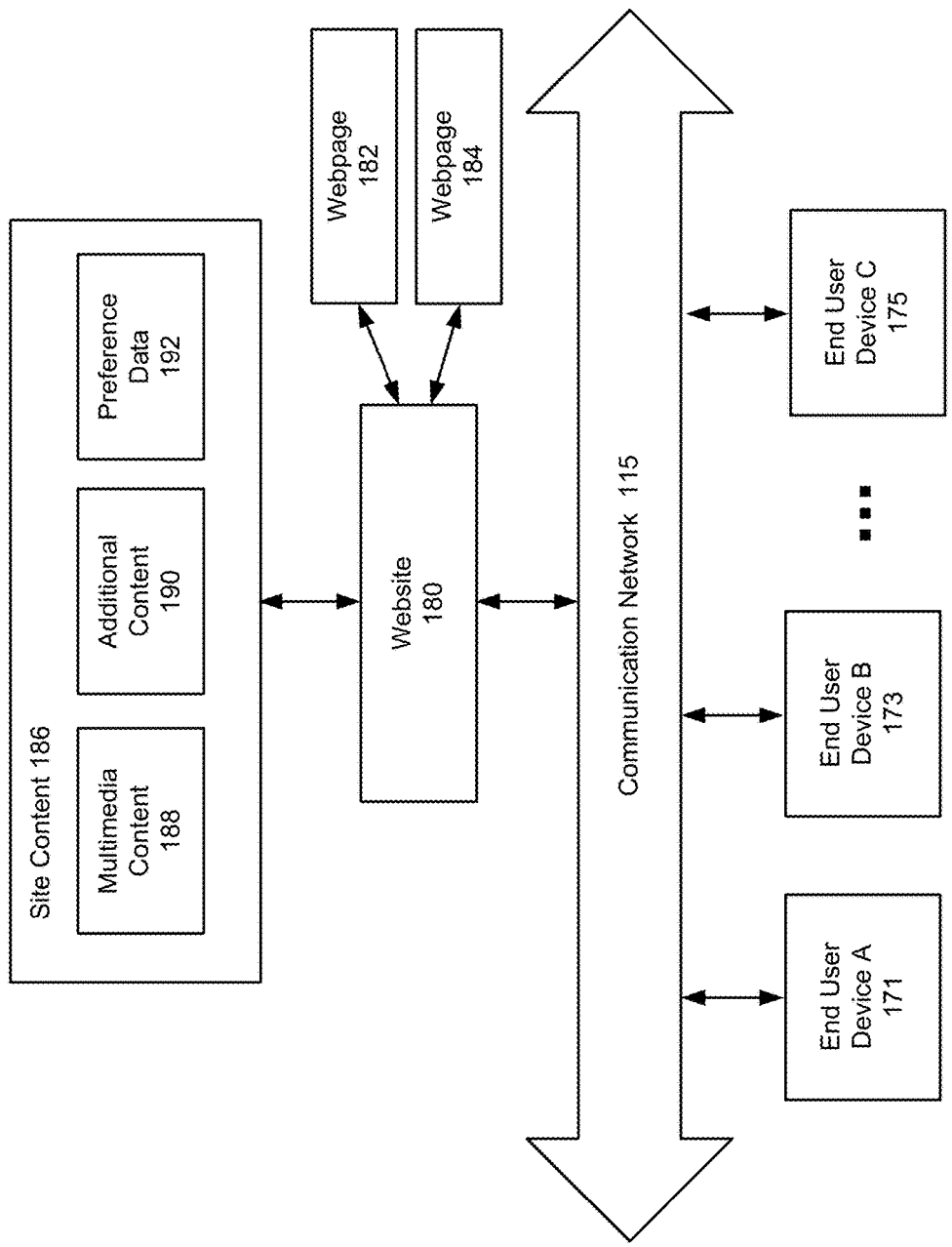
FIG. 1B shows a system to present content to a user in accordance with an embodiment of the disclosure.

FIG. 1B shows a system to present content and titles (e.g., such as content for a news site as described above) to a user according to one embodiment. In FIG. 1B, the end user devices (e.g., 171, 173, . . . , 175) are used to access a website 180 (e.g., a news site as discussed above) over a communication network 115. Website 180 presents various forms of content on webpages 182, 184. The website 180 may include one or more web servers (or other types of data communication servers) to communicate with the end user devices (e.g., 171, 173, . . . , 175).

The website 180 is connected to a data storage facility to store site content 186, such as multimedia content 188, additional content 190, preference data 192, etc. Webpage 182 may, for example, display content associated with news.

Although FIG. 1B illustrates an example system implemented in client server architecture, embodiments of the disclosure can be implemented in various alternative architectures. For example, the website can be implemented via a peer to peer network of end user devices, where the content and/or titles are shared via peer to peer communication connections. For example, some functions may be implemented in the individual end user devices, instead of running on one or more centralized servers.

In some embodiments, a combination of client server architecture and peer to peer architecture can be used, in which one or more centralized servers may be used to provide some of the information and/or services and the peer to peer network is used to provide other information and/or services. Thus, embodiments of the disclosure are not limited to a particular architecture.

Figure 2A:
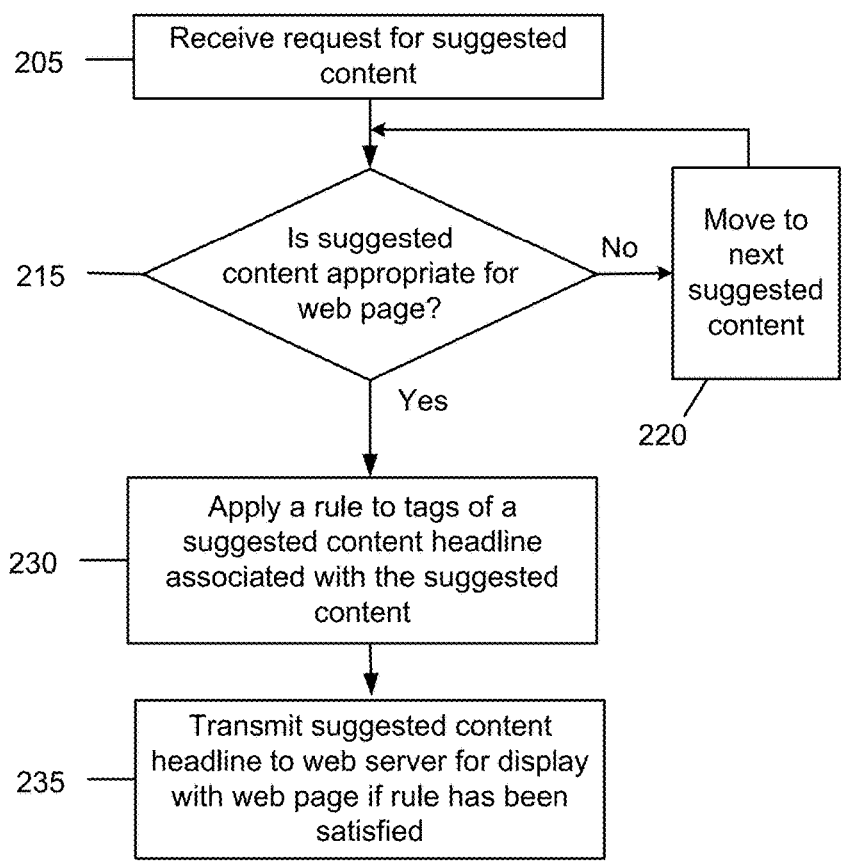
FIG. 2A is a flowchart showing steps performed by the suggested content server in accordance with an embodiment of the disclosure.

FIG. 2A is a flowchart illustrating operations performed by the suggested content server 130 in accordance with an embodiment of the present disclosure. The web server 110 receives request 120 for a web page. In operation 205, the suggested content server 130 receives request 125 for suggested content for the web page from the web server 110. In one embodiment, the suggested content server 130 tags the web page with tags describing characteristics of the web page. In one embodiment, the suggested content server 130 determines whether the suggested content is appropriate for the web page based on the tags for the web page and tags for a suggested content headline associated with the suggested content (operation 215). If not, the suggested content server 130 reviews another suggested content and suggested content headline (operation 220) and returns to operation 215.

If so, the suggested content server 130 overlays the tags of the suggested content headline with one or more of time and location metadata. This overlaying of tags may occur before operation 205 has occurred or after operation 205 has occurred. The suggested content server 130 then applies a rule to the tags of the suggested content headline, where the rule is based on the one or more time and location metadata (operation 230). In one embodiment, the suggested content server 130 transmits the suggested content headline to the web server 110 for display with the web page if the rule has been satisfied (operation 235).

Figure 2B:
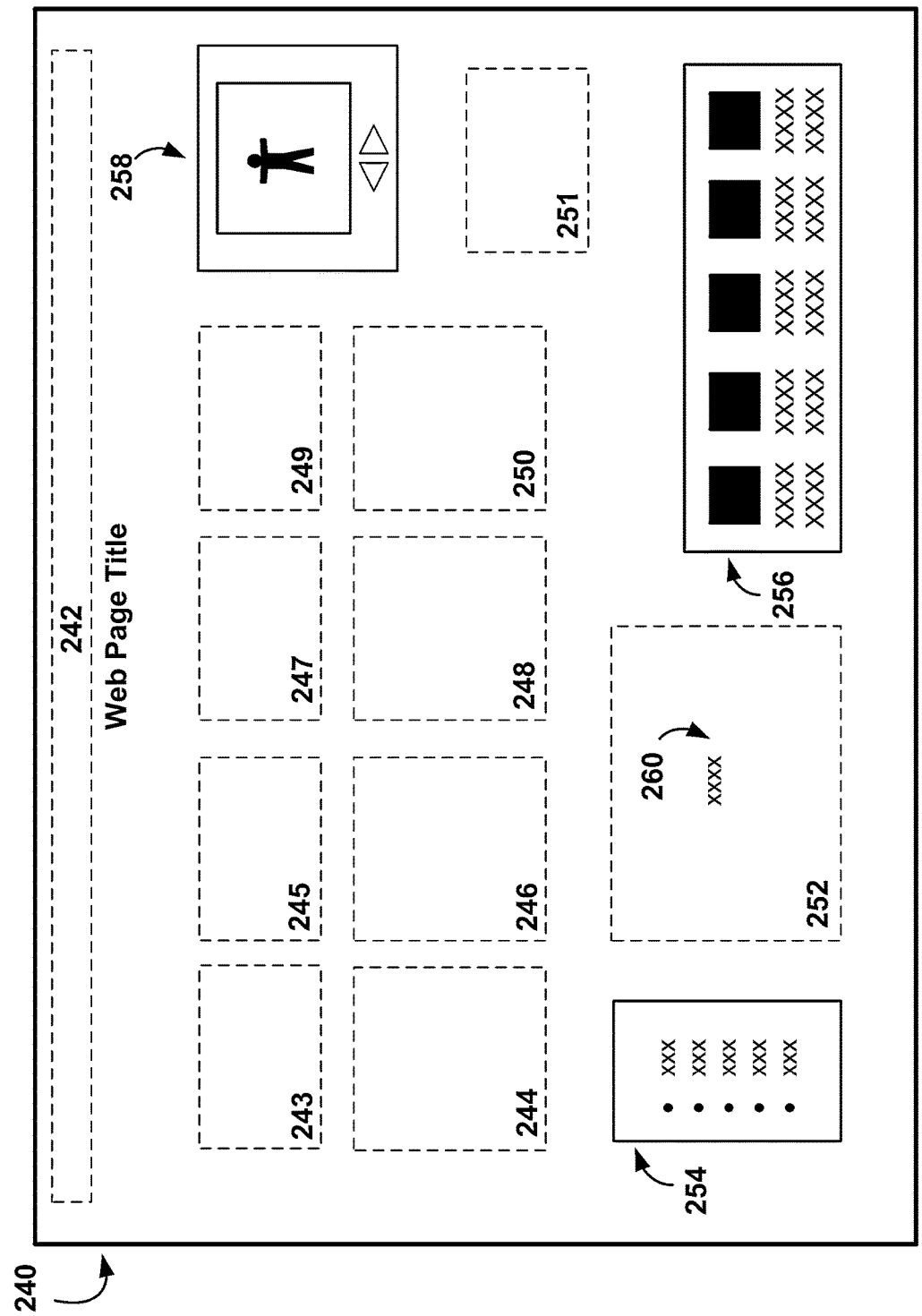
FIG. 2B is an exemplary webpage that displays a variety of links in accordance with an embodiment of the disclosure.

FIG. 2B illustrates an exemplary webpage 240 that displays a variety of links relevant to, for example, the page content, the viewing user or users in general. The webpage 240 shown is a conventionally formatted webpage, having a title bar 242 and various content items 243-252. The content items 243-252 could be any type of content embedded in webpages such as, for example, text, images, multimedia objects and so forth. In one embodiment, the systems displaying the webpage may identify suggested content that relates to, for example, the page content, the viewing user or users in general. In one embodiment, as shown in FIG. 2B, links for suggested content in a given page view can be presented via multiple user interface elements 254, 256, 258 and 260 positioned at any location within the webpage.

In one embodiment, links for suggested content can be displayed using any type of user interface element known in the art, such as, for example, simple lists of text 254, horizontal or vertical bars 256 containing thumbnail images, authors, and abstracts, scrollable slide shows 258 and/or arbitrary in-text phrases 260. In one embodiment, each user interface element 254, 256, 258 and 260 could display the same set of links, or could display different links, as described in detail below.

In one embodiment, the suggested content server 130 obtains suggested content from one or more of various data sources (not shown). Such data sources can include content databases and indexes maintained by the suggested content server 130, third-party databases and indexes maintained by third parties (including third-party content websites and social networking websites), user profile data maintained by the suggested content server 130 and/or session data logged by the suggested content server 130.

In one embodiment, the suggested content server 130 develops and tags suggested content headlines with time and location metadata 140 stored in database 145. These headlines can be generated by the suggested content server 130 or can be obtained from one or more other web servers (e.g., web server 110). In one embodiment, the suggested content server 130 performs the tagging of suggested content headlines prior to receiving a request 125 for suggested content. The tag assigned to a suggested content headline may relate to the associated suggested content, may relate to one or more terms in the suggested content headline, may relate to both the suggested content headline and the suggested content, may relate to an extrinsic quality such as time, season, month, week, date, weather, or any other factor. In one embodiment, the suggested content server 130 performs this tagging and/or developing at one or more specific times, periodically, intermittently, etc.

Figure 2C:
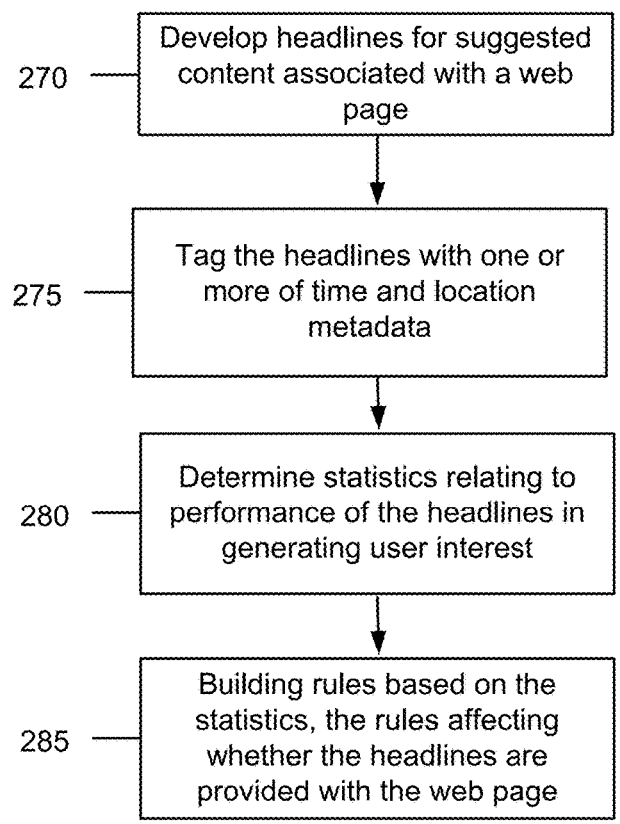
FIG. 2C is a flowchart showing steps performed by the suggested content server in accordance with an embodiment of the disclosure.

In one embodiment and referring to FIG. 2C, the suggested content server 130 develops headlines for suggested content associated with a web page (operation 270). The suggested content server 130 tags the headlines with one or more of time and location metadata (operation 275). The suggested content server 130 accumulates statistics relating to the performance of the headlines in generating user interest (operation 280). These statistics can include, for example, time and/or location, such as whether a particular title tends to generate interest at particular times of the day or in a particular region or location. In one embodiment, these statistics are used to build the one or more rules (operation 285). These rules can, in one embodiment, help determine which suggested content headline is used for particular suggested content 135. In one embodiment, the suggested content server 130 applies one or more of these rules when assigning a suggested content headline 165 to suggested content 160 displayed on web page 155. In one embodiment, this accumulation of statistics on various headlines occurs prior to receiving request 125. In another embodiment, this accumulation of statistics occurs periodically, at fixed times, on a schedule, etc.

Figure 3A:
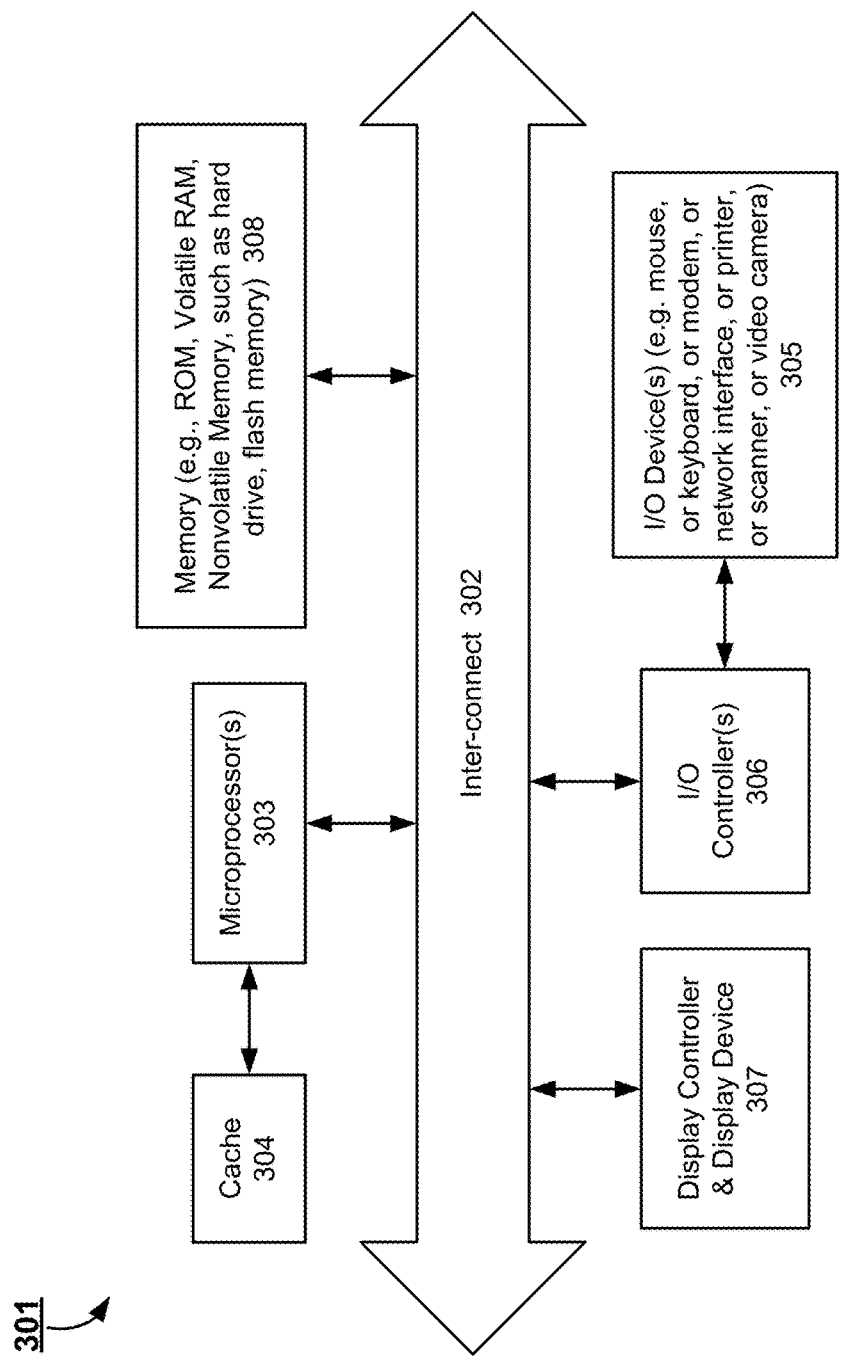
FIG. 3A is a block diagram showing components of a computer system in accordance with an embodiment of the disclosure.

FIG. 3A shows a block diagram of a data processing system which can be used in various embodiments (e.g., as a server for a website for news, or for implementing time and location-based rules as described above). While FIG. 3A illustrates various components of a computer system, it is not intended to represent any particular architecture or manner of interconnecting the components. Other systems that have fewer or more components may also be used.

In FIG. 3A, the system 301 includes an inter-connect 302 (e.g., bus and system core logic), which interconnects a microprocessor(s) 303 and memory 308. The microprocessor 303 is coupled to cache memory 304 in the example of FIG. 3A.

The inter-connect 302 interconnects the microprocessor(s) 303 and the memory 308 together and also interconnects them to a display controller and display device 307 and to peripheral devices such as input/output (I/O) devices 305 through an input/output controller(s) 306. Typical I/O devices include mice, keyboards, modems, network interfaces, printers, scanners, video cameras and other devices which are well known in the art.

The inter-connect 302 may include one or more buses connected to one another through various bridges, controllers and/or adapters. In one embodiment the I/O controller 306 includes a USB (Universal Serial Bus) adapter for controlling USB peripherals, and/or an IEEE-1394 bus adapter for controlling IEEE-1394 peripherals.

The memory 308 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 3A is used to implement website 180 and/or other servers. In one embodiment, a data processing system as illustrated in FIG. 3A is used to implement an end user device 171, 173, 175. An end user device may be in the form of a personal digital assistant (PDA), a cellular phone, a smartphone, a notebook computer, a laptop computer, a tablet, or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 303 and/or the memory 308. For example, the functionalities described can be partially implemented via hardware logic in the microprocessor(s) 303 and partially using the instructions stored in the memory 308. Some embodiments are implemented using the microprocessor(s) 303 without additional instructions stored in the memory 308. Some embodiments are implemented using the instructions stored in the memory 308 for execution by one or more general purpose microprocessor(s) 303. Thus, the disclosure is not limited to a specific configuration of hardware and/or software.

Figure 3B:
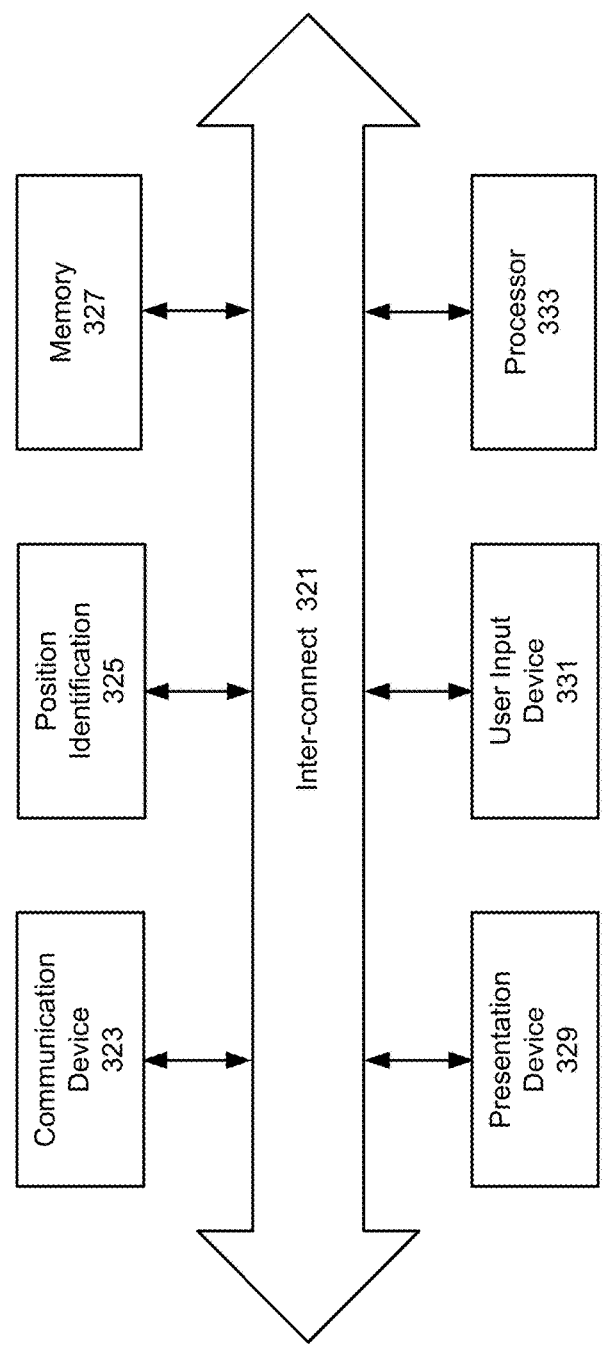
FIG. 3B is a block diagram showing components of a user device in accordance with an embodiment of the disclosure.

FIG. 3B shows a block diagram of a user device according to one embodiment. In FIG. 3B, the user device includes an inter-connect 321 connecting the presentation device 329, user input device 331, a processor 333, a memory 327, a position identification unit 325 and a communication device 323.

In FIG. 3B, the position identification unit 325 is used to identify a geographic location for user content created for sharing. The position identification unit 325 may include a satellite positioning system receiver, such as a Global Positioning System (GPS) receiver, to automatically identify the current position of the user device. In FIG. 3B, the communication device 323 is configured to communicate with a website to provide user data content tagged with user-generated data. The user input device 331 may include a text input device, a still image camera, a video camera, and/or a sound recorder, etc.

In one embodiment, the user input device 331 and the position identification unit 325 are configured to automatically tag the user data content created by the user input device 331 with information identified by the position identification unit 325.

Content Selection System

In one embodiment, website 180 is part of a system (e.g., identified as "Hermosa" in some of the accompanying figures) for selecting content to present to a user (e.g., via end user device 171). The content may originate from the website owner and/or third party publishers. When a user clicks to view content, the owner of the content receives a per-click revenue share.

FIG. 4 shows the collection and selection of content, and distribution of content, to users of communication network 115 according to one embodiment. Some sites may be connected to a content selection system 405 in order to contribute content. Other sites may be connected to the system 405 in order to distribute content that has been selected for distribution. In some cases, a site may perform both functions.

Figure 5:
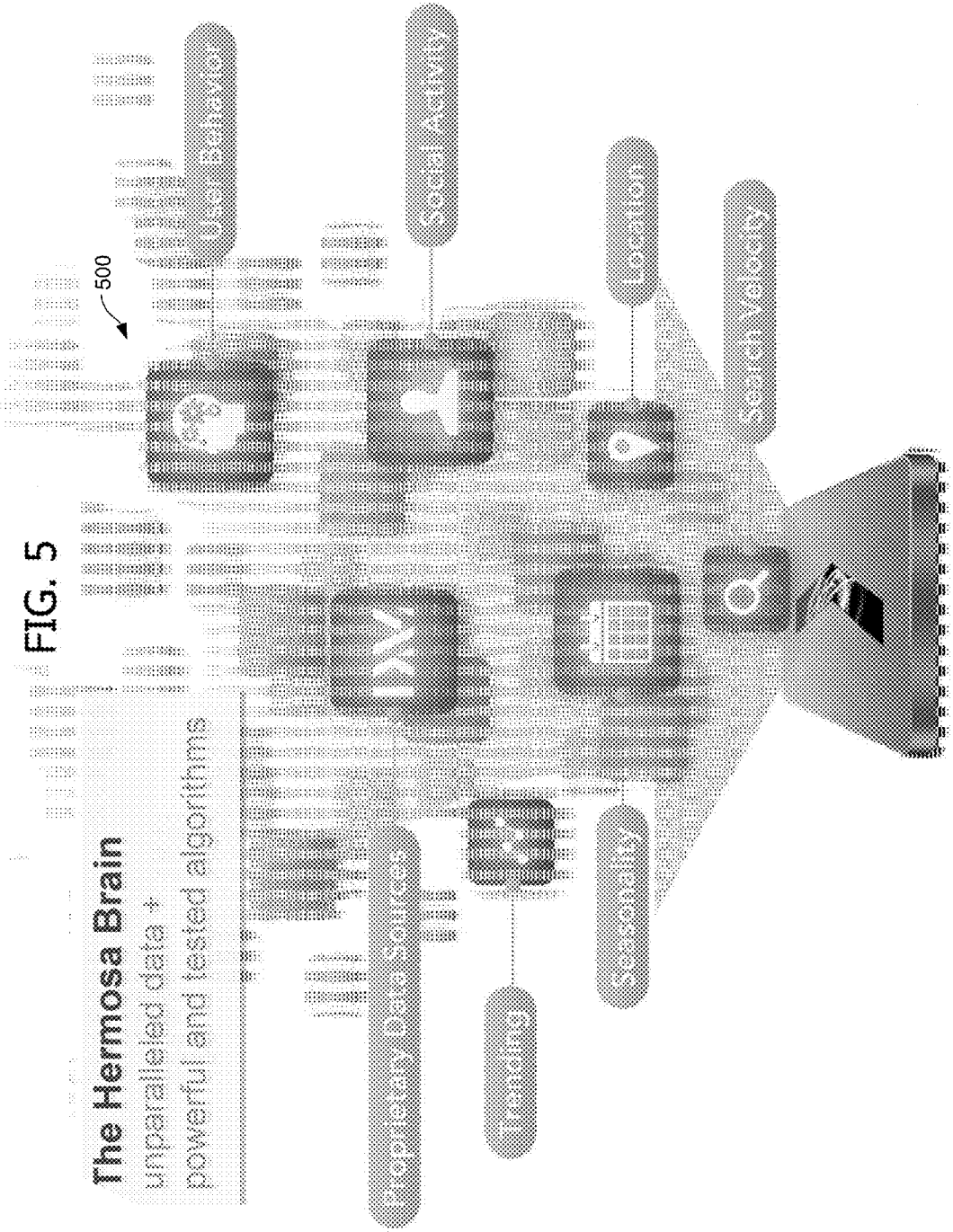
FIG. 5 shows the use of various sources and types of data for the selection of content or titles for presenting to a user in accordance with an embodiment of the disclosure.

FIG. 5 shows the use of various sources and types of data 500 for the selection of content or titles for presenting to a user according to one embodiment. These sources of data may be analyzed in some embodiments by using a variety of algorithms. In one embodiment, there may be predefined approaches used for selecting the particular algorithms to use for a given website or user. The data for this analysis may come from the end user devices, third-party databases, or other external data sources.

Figure 6:
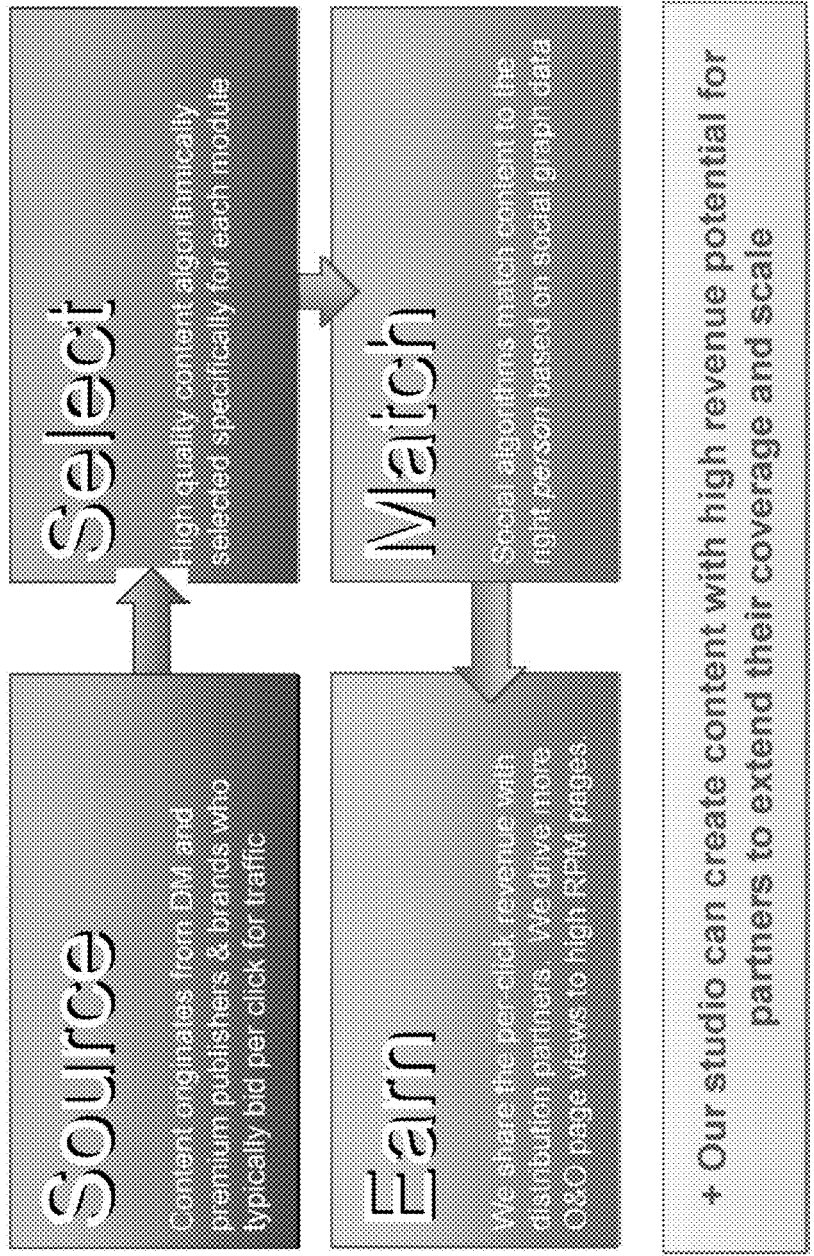
FIG. 6 shows a method for earning revenue from the sourcing, selecting, and presenting of content to users of a communication network in accordance with an embodiment of the disclosure.

FIG. 6 shows a method 600 for earning revenue from the sourcing, selecting, and presenting of content to users of communication network 115 according to one embodiment. More specifically, this method involves the following operations. First, the content is sourced from the website owner and/or third parties such as premium publishers and brands who typically bid per click for traffic. Next, high-quality content is algorithmically selected specifically (e.g., for each module). This selection may be performed using one or more of the algorithms as discussed in FIG. 5.

In an alternative embodiment, in addition to the selection of the content just described above, social algorithms may be used to match content to the right type of person, or a specifically identifiable person, based on social graph data (for example, a social graph for a unique user). When the user of an end user device 171 clicks on a title or otherwise selects content for viewing, revenue is shared with distribution partners. For example, this revenue may be determined in one embodiment on a per-click basis.

In an alternative embodiment, content can be created having higher revenue potential for content owners or contributors. The content created may be based on a title selected using any one or more of the algorithms described earlier above, and including the time and location-specific, tag-based rules described earlier.

In one embodiment, the use of intelligent algorithms permits the presentation of relevant content to users. Typically, users prefer content options instead of advertising. Thus, typically there is a better click through rate for content than for advertising.

In one embodiment, a configurable widget or gadget is provided that includes links to a publisher's own content (via a site or across a network), and may also include paid content. A variety of widget configurations may be used. The publisher's content may be submitted to the content selection system via a URL or a site map.

In one embodiment, a customer submits site links such as URLs or a site map to the content selection system. The customer then installs one or more widgets in its website.

Figure 7:
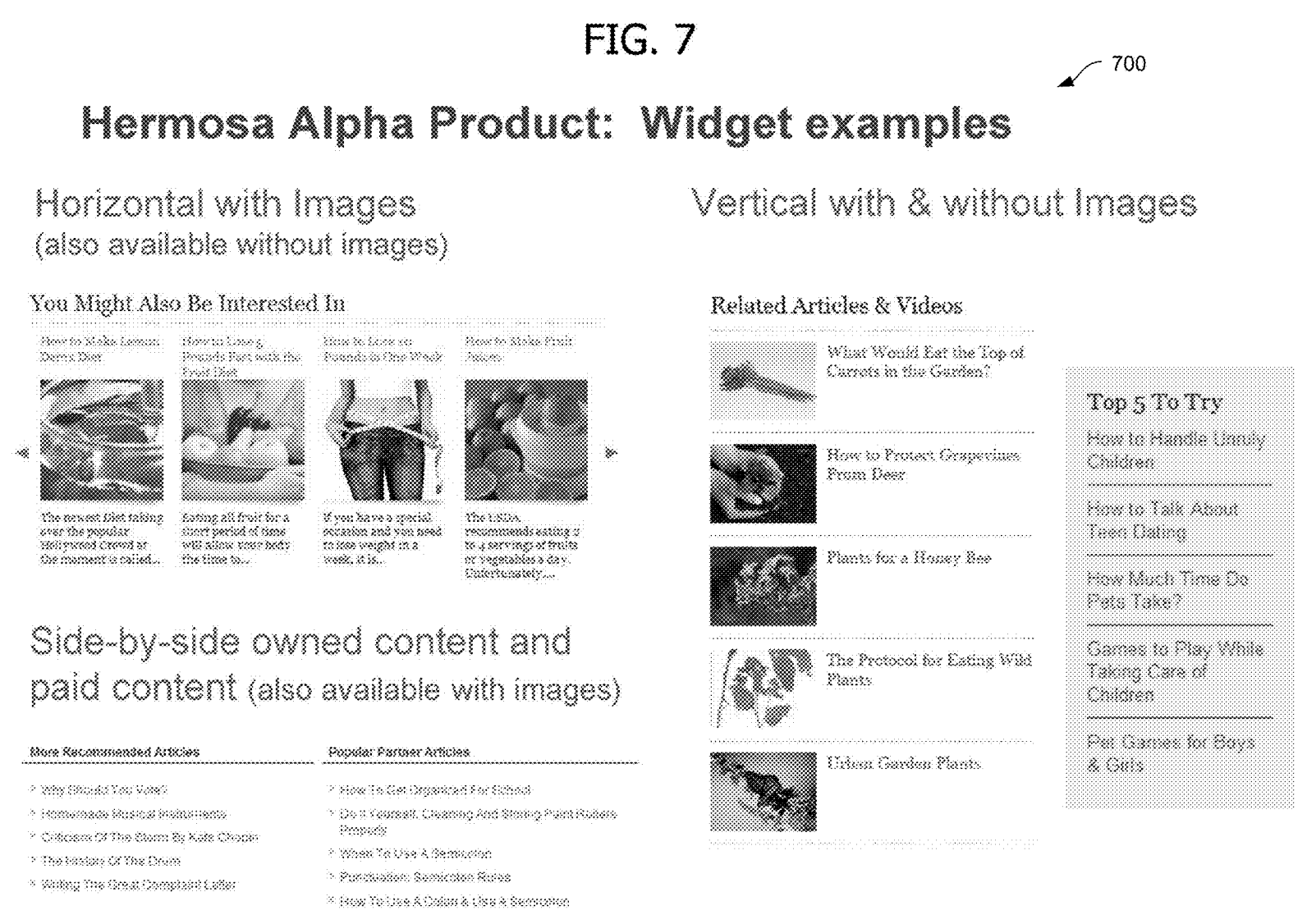

FIG. 7 shows examples of displays 700 presented to users of widgets used in conjunction with the content selection system in order to present content options or titles for users of an end user device according to one embodiment. Titles for content owned by the website owner are displayed side-by-side with content of third-party contributors. Content or titles selected using the approaches described herein may be accompanied by an image and/or a short abstract further describing the content for the user.

Figure 8:
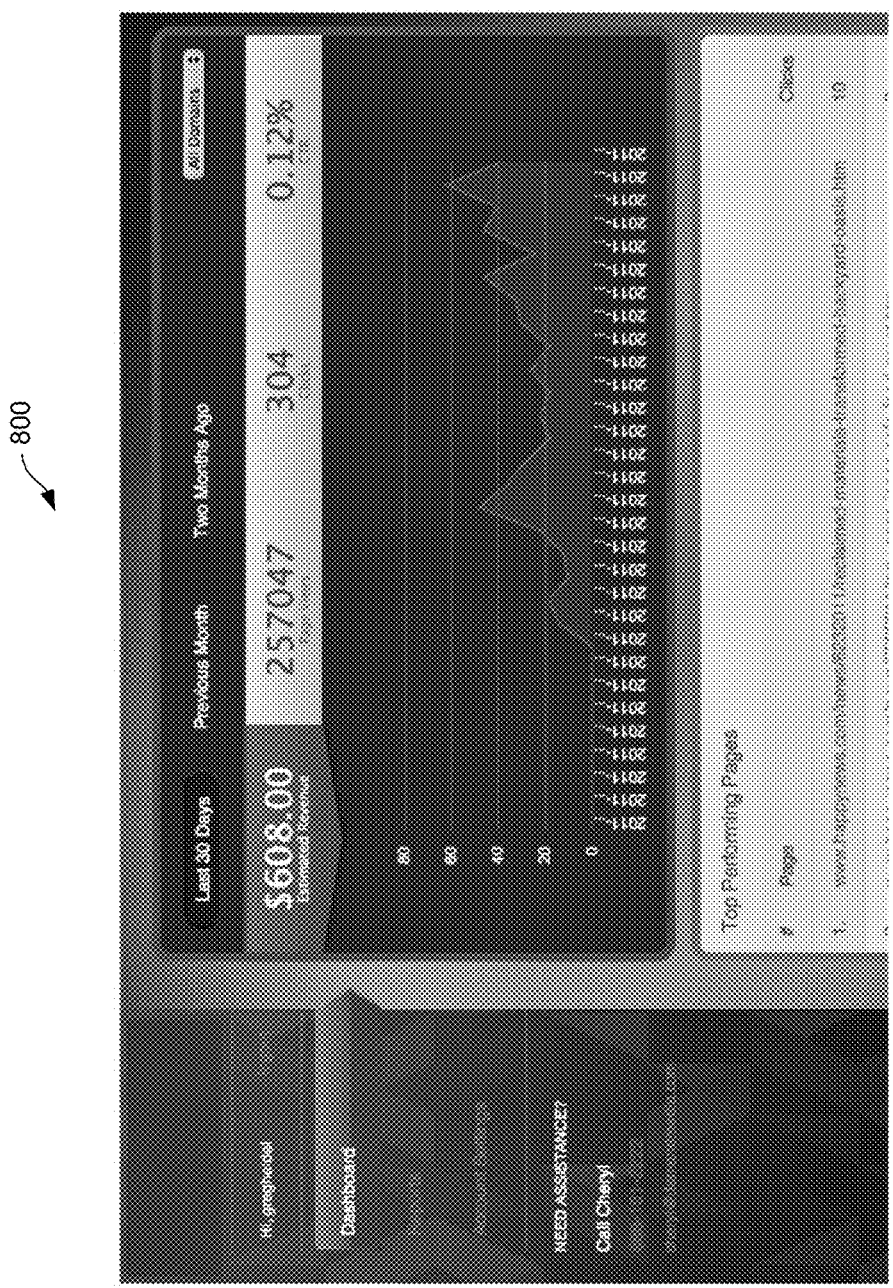
FIG. 8 shows a console or dashboard that is presented to a content owner that is earning revenue from a content selection system in accordance with an embodiment of the disclosure.

FIG. 8 shows a console or dashboard 800 presented to a content owner or content contributor that is earning revenue from the content selection system according to one embodiment. An estimate of revenue is presented to the content owner or publisher via the dashboard. Also, the number of page views, clicks, and a click-through rate may be presented. This information may also be presented graphically as illustrated.

In one embodiment, this dashboard or publisher console 800 is made available so that the publisher can set up an account with the system and can configure its widget. Reporting is available via the dashboard 800 (for example impressions, click-through rate, and estimated revenue).

Figure 9:
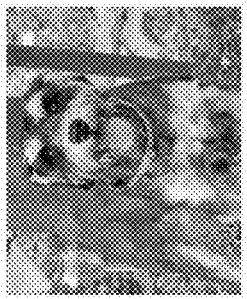
FIG. 9 shows an example of a website having a webpage that presents titles to a user of an end user device in accordance with an embodiment of the disclosure.

FIG. 9 shows an example of a website 900 having a webpage that presents titles to a user of an end user device according to one embodiment.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A non-transitory machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:

storing, in a content server, a plurality of article pages accessible via a home page of a website;

storing, in the content server for each respective article page among the plurality of article pages, a plurality of copy-written headlines of the respective article page;

tagging the each respective article page with article tags describing characteristics of the each respective article page;

identifying performance of combinations of headline tags using machine learning, wherein identifying the performance of the combinations of headline tags using machine learning comprises determining optimal combinations of metadata, and wherein a portion of the metadata relates to headline format;

tagging each respective headline of the plurality of copy-written headlines with respective combinations of headline tags describing characteristics of the respective headline, wherein at least a portion of the article tags and the respective combinations of headline tags describes time and location characteristics of the each respective article page;

storing, in a database, performance metrics associated with the performance of the combinations of headline tags;

tagging the performance metrics with at least time and location tags;

configuring the home page of the website with an embedded reference to obtain content from the content server;

receiving a request of an end user device for the home page; and in response to the request of the end user device:

identifying, by a computing device, location and time information of the request of the end user device;

generating, by the computing device, a request for content according to the embedded reference in the home page;

selecting, from the plurality of article pages, a suggested article page and selecting a suggested headline from a plurality of copy-written headlines of the suggested article page by:

determining, by the computing device, performance of the plurality of copy-written headlines of the suggested article page based at least in part on the location and time information of the request of the end user device;

determining, by the computing device, that the suggested article page is appropriate for the home page based on:

article tags of the article page, headline tags of the plurality of copy-written headlines of the suggested article page, and the performance of the plurality of copy-written headlines of the suggested article page, identified by:

transmitting, by the computing device to the database, a request for time and location metadata;

receiving, by the computing device, the time and location metadata from the database, based on the location and time information of the request of the end user device; and overlaying, by the computing device, the headline tags of the plurality of copy-written headlines of the suggested article page with the time and location metadata retrieved from the database; and selecting the suggested headline from the plurality of copy-written headlines of the suggested article page based on applying, by the computing device, a rule to identify optimal performance indicated by overlaying time and location in the headline tags of the plurality of copy-written headlines of the suggested article page and the time and location metadata retrieved from the database, wherein the optimal performance is identified based at least on the performance metrics stored in the database;

configuring, by the computing device, the home page to include the suggested headline with a link to the article page; and transmitting, by the website to the end user device, the home page that is configured with the suggested headline having the link to the suggested article page.

2. The method of claim 1, wherein the time and location metadata from the database comprises a subset of locations.

3. The method of claim 2, wherein the subset of locations comprises at least one of a coastal location, an inland location, an urban location, or a rural location.

4. A system comprising:

at least one processor; and memory storing instructions configured to instruct the at least one processor to:

receive, over a network, a request for suggested content for a web page;

store, in a content server, a plurality of article pages accessible via a home page of a website;

store, in the content server for each respective article page among the plurality of article pages, a plurality of copy-written headlines of the respective article page;

tag the each respective article page with tags describing characteristics of the each respective article page;

identify performance of combinations of headline tags using machine learning, wherein identifying the performance of the combinations of headline tags using machine learning comprises determining optimal combinations of metadata including metadata relating to format, and wherein a portion of the metadata relates to headline format;

tag each respective headline of the plurality of copy-written headlines with respective combinations of headline tags describing characteristics of the respective headline, wherein at least a portion of the article tags and the respective combinations of headline tags describes time and location characteristics of the each respective article page;

store, in a database, performance metrics associated with the performance of the combinations of headline tags;

tag the performance metrics with at least time and location tags;

configure the home page of the website with an embedded reference to obtain content from the content server;

receive a request of an end user device for the home page;

in response to the request of the end user device:

identify, by a computing device, location and time information of the request of the end user device;

generate, by the computing device, a request for content according to the embedded reference in the home page;

select, from the plurality of article pages, a suggested article page and select a suggested headline from a plurality of copy-written headlines of the suggested article page by:

determine, by the computing device, performance of the plurality of copy-written headlines of the suggested article page based at least in part on the location and time information of the request of the end user device;

determine, by the computing device, that the suggested article page is appropriate for the home page based on:

article tags of article page, headline tags of the plurality of copy-written headlines of the suggested article page, and the performance of the plurality of copy-written headlines of the suggested article page, identified by:

transmitting, by the computing device to the database, a request for time and location metadata;

receiving, by the computing device, the time and location metadata from the database, based on the location and time information of the request of the end user device;

overlaying, by the computing device, the headline tags of the plurality of copy-written headlines of the suggested article page with the time and location metadata retrieved from the database;

select the suggested headline from the plurality of copy-written headlines of the suggested article page based on applying a rule to identify optimal performance indicated by overlaying time and location in the headline tags of the plurality of copy-written headlines of the suggested article page and the time and location metadata retrieved from the database, wherein the optimal performance is identified based at least on the performance metrics stored in the database;

configure, by the computing device, the home page to include the suggested headline with a link to the article page; and transmit, by the website to the end user device, the home page that is configured with the suggested headline having the link to the suggested article page.

5. A non-transitory computer readable medium storing instructions which when executed by a computing apparatus cause the computing apparatus to perform a method, the method comprising:

storing, in a content server, a plurality of article pages accessible via a home page of a website;

storing, in the content server for each respective article page among the plurality of article pages, a plurality of copy-written headlines of the respective article page;

tagging the each respective article page with article tags describing characteristics of the each respective article page;

identifying performance of combinations of headline tags using machine learning, wherein identifying the performance of the combinations of headline tags using machine learning comprises determining optimal combinations of metadata including metadata relating to format, and wherein a portion of the metadata relates to headline format;

tagging each respective headline of the plurality of copy-written headlines with respective combinations of headline tags describing characteristics of the respective headline, wherein at least a portion of the article tags and the respective combinations of headline tags describes time and location characteristics of the each respective article page;

storing, in a database, performance metrics associated with the performance of the combinations of headline tags;

tagging the performance metrics with at least time and location tags;

configuring the home page of the website with an embedded reference to obtain content from the content server;

receiving a request of an end user device for the home page; and in response to the request of the end user device:

identifying, by a computing device, location and time information of the request of the end user device;

generating, by the computing device, a request for content according to the embedded reference in the home page;

selecting, from the plurality of article pages, a suggested article page and selecting a suggested headline from a plurality of copy-written headlines of the suggested article page by:

determining, by the computing device, performance of the plurality of copy-written headlines of the suggested article page based at least in part on the location and time information of the request of the end user device;

determining, by the computing device, that the suggested article page is appropriate for the home page based on:

article tags of the article page, headline tags of the plurality of copy-written headlines of the suggested article page, and the performance of the plurality of copy-written headlines of the suggested article page, identified by:

transmitting, by the computing device to the database, a request for time and location metadata;

receiving, by the computing device, the time and location metadata from the database, based on the location and time information of the request of the end user device; and overlaying, by the computing device, the headline tags of the plurality of copy-written headlines of the suggested article page with the time and location metadata retrieved from the database; and selecting the suggested headline from the plurality of copy-written headlines of the suggested article page based on applying, by the computing device, a rule to identify optimal performance indicated by overlaying time and location in the headline tags of the plurality of copy-written headlines of the suggested article page and the time and location metadata retrieved from the database, wherein the optimal performance is identified based at least on the performance metrics stored in the database;

configuring, by the computing device, the home page to include the suggested headline with a link to the article page; and transmitting, by the website to the end user device, the home page that is configured with the suggested headline having the link to the suggested article page.

\* \* \* \* \*